AUTOMATIC THREAD JOINER FOR CONTINUOUS SPINNING MACHINES

Original Filed June 11, 1962 8 Sheets-Sheet 1

INVENTOR

ROBERTO ESCURSELL-PRAT

BY Martin Kirkpatrick

ATTORNEY

June 27, 1967 R. ESCURSELL PRAT Re. 26,230

AUTOMATIC THREAD JOINER FOR CONTINUOUS SPINNING MACHINES

Original Filed June 11, 1962 8 Sheets-Sheet 1

INVENTOR

ROBERTO ESCURSELL-PRAT

BY Marty Kirkpatrick

ATTORNEY

AUTOMATIC THREAD JOINER FOR CONTINUOUS SPINNING MACHINES

Original Filed June 11, 1962 8 Sheets-Sheet 3

INVENTOR.
ROBERTO ESCURSELL-PRAT
BY Martin Lukpatrick
ATTORNEY

AUTOMATIC THREAD JOINER FOR CONTINUOUS SPINNING MACHINES
Original Filed June 11, 1962 8 Sheets-Sheet 4
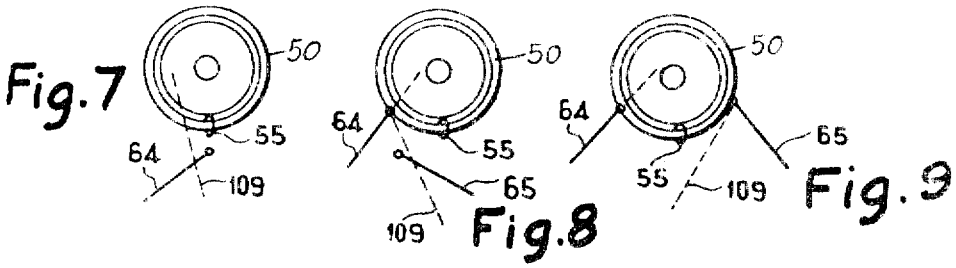
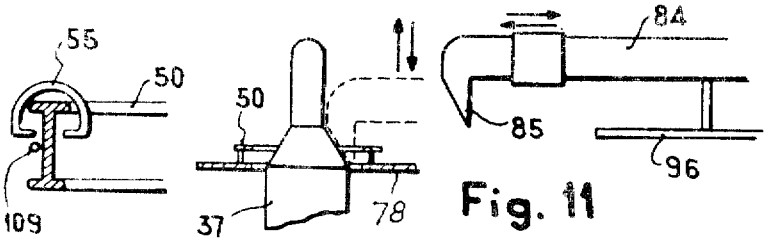
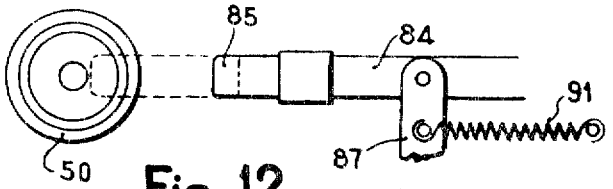
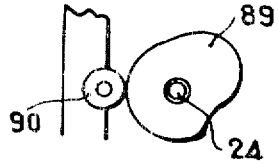
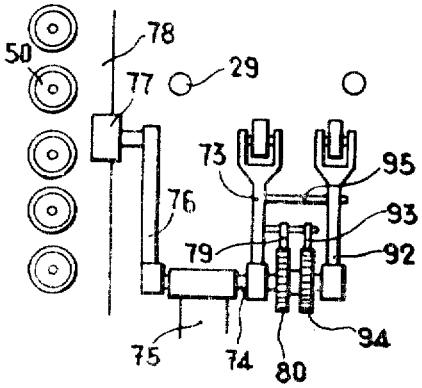
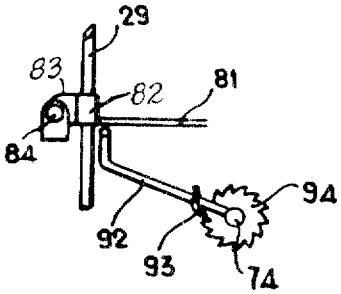
INVENTOR.
ROBERTO ESCURSELL-PRAT
BY Martin Kufferstein
ATTORNEY AUTOMATIC THREAD JOINER FOR CONTINUOUS SPINNING MACHINES
Original Filed June 11, 1962 8 Sheets-Sheet 5
Fig. 15
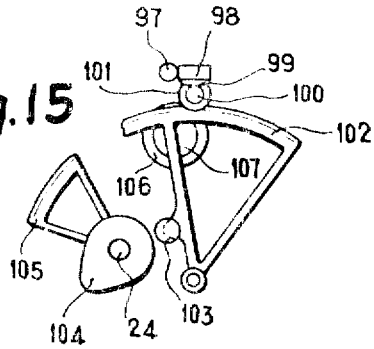
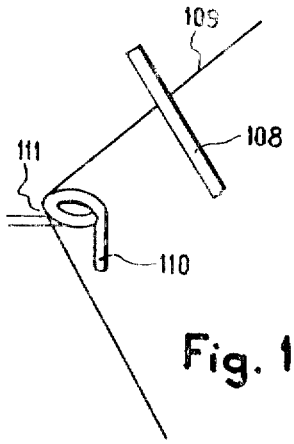
Fig. 16
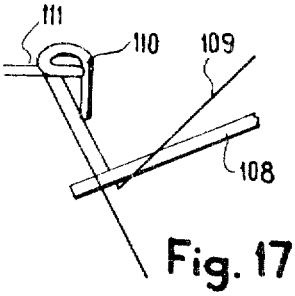
Fig. 17
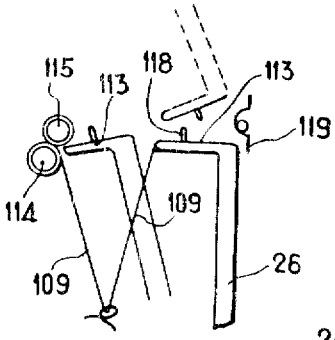
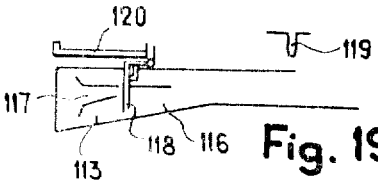
Fig. 19
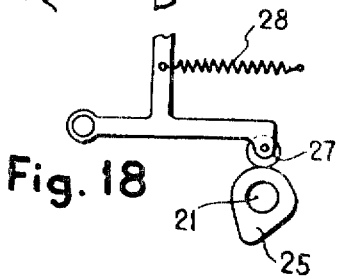
Fig. 18
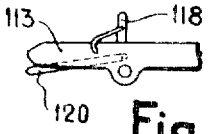
Fig. 20
INVENTOR.
ROBERTO ESCURSELL-PRAT
BY Martin Kubyatinsk
ATTORNEY

AUTOMATIC THREAD JOINER FOR CONTINUOUS SPINNING MACHINES

Original Filed June 11, 1962 8 Sheets-Sheet 8

INVENTOR.
ROBERTO ESCURSELL-PRAT
BY Marlin K. Spatent
ATTORNEY

AUTOMATIC THREAD JOINER FOR CONTINUOUS SPINNING MACHINES

Original Filed June 11, 1962 8 Sheets-Sheet 7

INVENTOR.
ROBERTO ESCURSELL-PRAT
BY Martin Rudzpatrick
ATTORNEY

AUTOMATIC THREAD JOINER FOR CONTINUOUS SPINNING MACHINES

Original Filed June 11, 1962 8 Sheets-Sheet 9

INVENTOR.
ROBERTO ESCURSELL-PRAT
BY Stanley Kalpstein
ATTORNEY

United States Patent Office

Re. 26,230
Reissued June 27, 1967

26,230

AUTOMATIC THREAD JOINER FOR CONTINUOUS SPINNING MACHINES

Roberto Escursell-Prat, 35 Calle Mandri, Barcelona, Spain

Original No. 3,128,590, dated Apr. 14, 1964, Ser. No. 201,495, June 11, 1962. Application for reissue Apr. 5, 1966, Ser. No. 544,658
32 Claims. (Cl. 57—34)

Matter enclosed in heavy brackets [ ] appears in the original patent but forms no part of this reissue specification; matter printed in italics indicates the additions made by reissue.

*ABSTRACT OF THE DISCLOSURE*

*An automatic thread joiner for spinning machines having a spindle rail supporting a plurality of aligned bobbin supporting driven spindles for each of which a thread issues from drafting rollers and is fed through a fixed guide and a traveller on a ring surrounding the respective spindle. The rings for all of the spindles are carried by a ring rail reciprocable axially of the spindles so that the travellers will guide the thread along the bobbins as it is wound thereon by rotation of the spindles. The thread joiner comprises a carriage movable along the spindle rail of such a spinning machine. A detector device is movably mounted on the carriage and includes a shoe for slidably engaging the threads between the drafting rollers and fixed guides of the spinning machine. The thread joining mechanism also includes means on the carriage for braking and stopping the spindle corresponding to a broken thread, support means vertically movable on the carriage carrying a thread extractor having a mouthpiece for extracting the end of the broken thread from the bobbin on such spindle and establishing a stressed length of thread between the mouthpiece and the bobbin. Means are provided for moving the extractor mouthpiece together with the stressed thread into the appropriate position for being threaded, for threading the stressed thread into the respective fixed thread guide on the spinning machine, for hunting and moving the respective traveller to a predetermined position on its ring and for threading the stressed thread laterally through the traveller. A device is provided for gripping the thread raised by the extractor mouthpiece and for cutting off excess thread, such gripping device being operative to place the cut thread end in engagement with the roving issuing from the respective drafting rollers and release the cut thread end to be joined with the roving. Means are provided on the carriage responsive to the height of the ring rail for moving the support means to the proper level. Drive means are provided for driving the carriage and operating the thread joining mechanism, including clutch means actuated by the detector device to drive the carriage until a broken thread is detected and thereupon stop the carriage and drive the thread joining mechanism.*

This invention relates to apparatus for automatically joining together threads which break during the operation of continuous ring spinning machines.

Conventionally, spinning machines are supervised by a skilled operator who joins together any threads which may break. Labour costs for supervising the continuous machines used in a spinning process therefore represent a considerable factor in cost of production.

It is an object of this invention to reduce the high labour costs considerably and to provide a fully automatic apparatus which, as it moves along the working fronts of the machine under supervision, checks whether or not the thread is present in each of the spinning trains, stops when it detects a missing thread and joins the end of the broken thread with the roving on the front rollers of the drawing system and then continues its supervisory movements along one or more machines.

The apparatus according to the invention comprises a carriage adapted to move in front of and along the spinning spindles of one or more machines and including a detector which upon detecting the absence of one of the threads moving towards the bobbins, stops the carriage and starts the thread-joining mechanisms means on the carriage are movable along the guide rings of the traveller and move the traveller into an appropriate position for being threaded with the thread. Also provided on the carriage on an extractor for extracting the broken end of the thread from the bobbin, means for threading such end through the traveller, means for tensioning a thread between the mouthpiece of said extractor and the bobbin, means for threading said tensioned thread through the traveller, means for raising the extractor together with the tensioned thread, means for threading the same into the thread guide, and a device for gripping the thread raised by the extractor and having means for cutting off the excess thread. The latter device places the gripped thread in engagement with the roving issuing from the drafting rollers.

The devices co-operating with the traveller and with the thread reeled onto the bobbin may comprise a raising mechanism which is operated by the ring rail plate in order to place the last-mentioned devices at all times at the required operative height.

One embodiment of the invention is illustrated diagrammatically in the accompanying drawings. This embodiment comprises only mechanical motion means, but it should be understood that the motion means may be constituted by others as for example, magneto-electric, hydraulic, compressed air means or a combination of two or more of the said means. The novel features that are considered characteristic of the invention are set forth with particularity in the appended claims. The invention itself, however, both as to its organization and its method of operation, together with additional objects and advantages thereof, will best be understood from the following description of specific embodiments when read in connection with the accompanying drawings, wherein like reference characters indicate like parts throughout the several figures and in which:

FIGS. 7 to 10 show various phases of the passage of the thread through the traveller;

FIG. 11 shows how the thread end is searched for by a suction tube placed over the bobbin;

FIG. 12 is a plan view of the mechanism shown in FIG. 11;

FIGS. 13 to 15 show the system for moving the thread-searching mechanism, traveller hunter and thread inserter vertically;

FIGS. 16 and 17 show the passage of the thread through the thread guide;

FIGS. 18 to 20 illustrate the thread-joining device;

Figure 2:
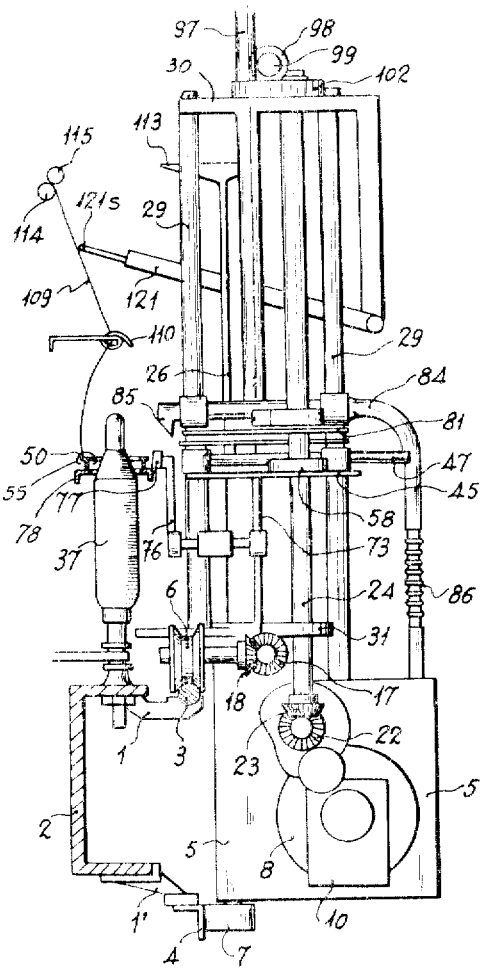
FIG. 2 is a side elevation of the apparatus, looking in the direction of the arrow II in FIG. 1.

The apparatus according to the invention is particularly adapted for use with continuous spinning machines of the type, best shown in FIG. 2, including a spindle rail 2 supporting a plurality of aligned bobbin supporting driven spindles 37 to each of which a thread 109 is fed from drafting rollers 114, 115 through a fixed guide 110 and a traveller 55 on a ring 50 surrounding the respective spindle. All of the rings 50 are carried by a ring rail 78 which reciprocates axially of the spindles 37 to guide the thread 109 along the bobbins as it is wound thereon by rotation of the spindles 37.

The present apparatus comprises, as elements permanently fitted to a continuous spinning machine for operating the thread joiner, upper and lower brackets 1 and 1' (FIG. 2) secured to spindle rails 2 of the spinning machine; a horizontal bar or rail 3 secured to the top of the upper bracket 1, while a horizontal beam 4 with a vertical surface is secured to the bottom part of the lower bracket 1'. The moving part of the aparatus (FIG. 1) takes the form of a casing 5 to which are fitted upper grooved wheels 6 which have horizontal axes and which run along the horizontal bar 3, and bottom wheels 7 which have vertical axes and which run along the vertical surface of the horizontal beam 4, the co-operation of these elements ensuring that the assembly is vertical. An electric motor 8 is mounted in the casing 5 and is supplied with power by any known moving-contact system. The motor 8 is of the high-speed kind, has one end of its shaft directly coupled to a fan 9 and has the other end of the shaft connected to a speed reduction train 10 from which the main shaft 11 of the apparatus issues. If required, the fan 9 could be driven by a separate motor. Disposed on the main shaft 11 is a double clutch device 12 by means of which either a wheel 13 or a wheel 14 can be rotated selectively, as will be described hereinafter. The wheel 13 drives cylindrical wheels 15, 16 and bevel wheels 17, 18 to drive one grooved wheel 6 and therefore to move the complete apparatus. The wheel 14 drives cylindrical wheels 19, 20 which rotate a shaft 21. The clutch 12 can be operated electrically or mechanically by the thread detector, in a manner to be described hereinafter, the operation being such that for normal operation the wheel 13 is rotated, but when a thread is found to be missing, the wheel 13 is disengaged from the drive shaft 11 and the wheel 14 is engaged and rotated to operate the thread-joining elements.

The apparatus can move on closed circuits along one or more machines or can move reciprocatingly along one or more machines; in the case of reciprocating movement a reversing clutch must be provided in association with the wheels 13 to 18 to ensure that the wheel 6 reverses its rotation direction whenever the apparatus reaches the end of its travel.

The shaft 21 carries a bevel wheel 22 meshing with another bevel wheel 23 disposed on a vertical shaft 24. Also mounted on the shaft 21 is a cam 25 which operates a joining lever 26 through a roller 27 which is urged into engagement with the cam 25 by a spring 28. The lever 26 has features which will be described hereinafter. The casing 5 provides a rigid mounting for two or more vertical guide supports 29 (FIGS. 1 and 2) to the upper ends of which is fixed a top bearing plate 30 for the vertical shaft 24 and on which is slidably mounted frames 45 and 81 that carry various operating elements of the device.

Figures 3, 5, 6:
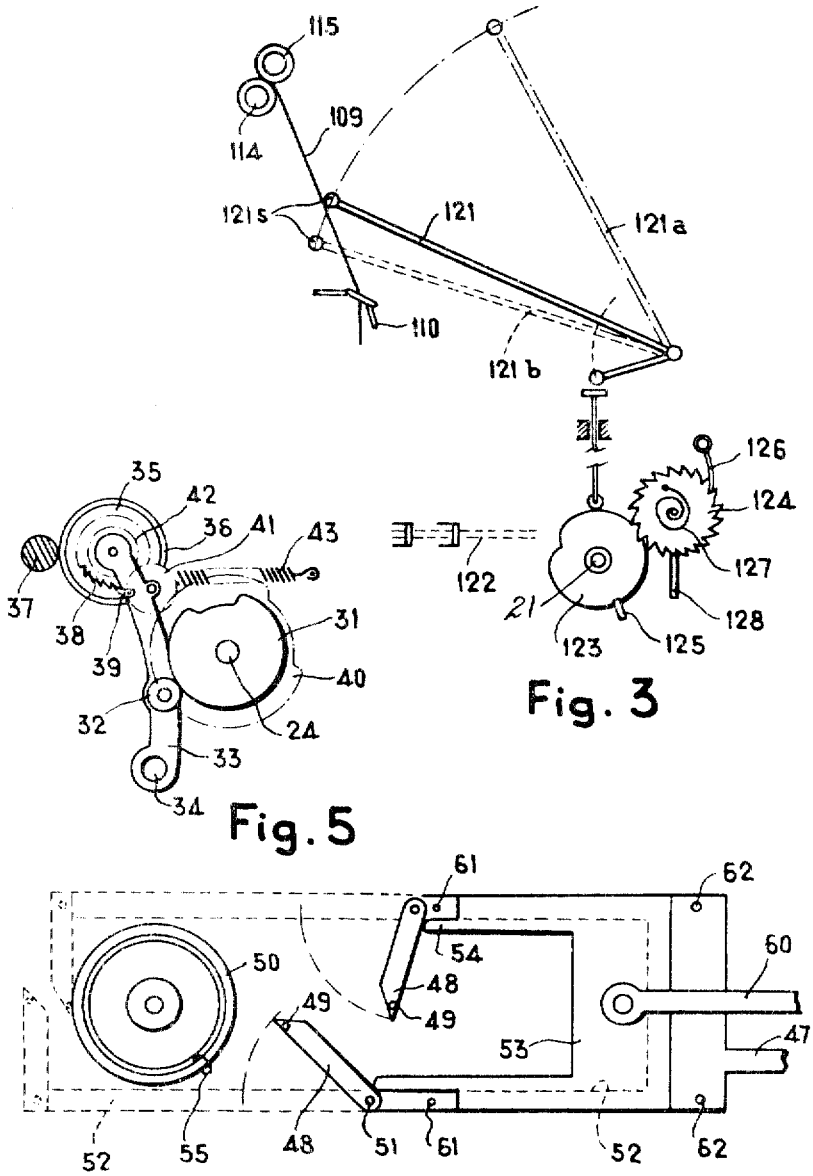
FIG. 3 shows the detector and stop motion which operates when the apparatus discovers a broken thread.
FIG. 5 is a plan view showing the system for stopping the spindle and moving the same backwards.
FIG. 6 is a plan view showing the system for hunting for the traveller ring and placing the same in the position for threading.

The vertical shaft 24 has near its bottom end a cam 31 (FIGS. 1 and 5) which, through the agency of a roller 32, moves a lever 33 pivotable at 34 and having at its free end a wheel 35, the periphery of which is covered with an adhesive rubber strip 36 (FIG. 5). When the cam 31 is rotated, the rubber strip 36 engages with a spindle 37 having a broken thread. The wheel 35 cannot be moved by the driven spindle 37, since the shaft of the wheel 35 is provided with a ratchet wheel 38 which is associated with a pawl 39 articulated to the lever 33 and which prevents the wheel 35 from being rotated by the spindle 37. The adhesion of the rubber strip 36 to the spindle 37 is such that the spindle 37 is stopped and forced to rotate backwards by means of a quadrant rack 40 rigidly secured to the vertical shaft 24. The quadrant rack 40 is engageable with a gear 41 which meshes with a pinion 42 rigidly secured to the axis of the wheel 35, thus ensuring that the spindle 37 concerned is moved backwards at the required time. Considering that the spindle is always under the actuation of the driving belt at a very high speed, the force of the rotating wheel 35 and the adhesion of the rubber strip 36 must be such to overcome the force of the driving belt which then only can slip on its pulley on the spindle. The roller 32 and the lever 33 which carries it are urged into engagement with the cam 31 by a spring 43. If required, the cam 31 can be of the grooved kind. Instead of the disc 35, an equivalent endless strip can be used.

The shaft 24 is formed with a lengthwise groove 43 in order to transmit its rotation to the elements to be described hereinafter. Bearings 44 are slidably mounted on the vertical guides 29 and serve as a support for, and are rigidly connected to, the frame 45 which is movable along the guides 29. The frame 45 acts as a bearing support for two aligned bearings 46 in which a rod 47 can move transversely of the spinning machine. Disposed on an end of the rod 47 (FIG. 6) is a device for placing the traveller in the threading position. This device comprises a number of small levers 48 and pins 49 projecting from the bottom of the free ends of the levers 48, the pins 49 engaging with the periphery of a ring 50. The levers 48 are mounted on pivots 51 rigidly secured to a bifurcated member 52, and springs (not shown) tend to maintain the levers 48 in the overlapping position shown in chain lines in FIG. 6. Since the parts under consideration are required to penetrate as far as the rearward part of the ring 50 but could not do so if they were in the inoperative position shown, the bifurcated member 52 is provided on the end of the shaft 47 and has slidingly mounted on it a member 53 which, through the agency of extensions 54, keeps the levers 48 open, rotating the same, as shown in full lines in FIG. 6, into their extended position so that the levers can pass by the sides of the ring 50. When the member 53 moves back, the levers 48 close, the pins 49 bearing against the edge of the ring 50, and when the member 52 is moved back, together with the levers 48 articulated to it, the pins 49 follow the external periphery of the ring 50 and force a traveller ring 55, wherever the same may be, to follow the same path as far as the front part of the ring 50. To ensure that the traveller ring 55 is always moved by the pins 49, the positions at which the pins engage the ring 50 slightly overlap each other, thus making it impossible for the traveller 55 to be disposed in a zone between the initial points of contact of the pins with the ring 50 and thus not be moved.

The members 47, 52 are moved through the agency of a lever 56 (FIG. 1) pivoted on a pin 57 rigidly secured to the sliding frame 45. The lever 56 is moved by a cam 58 carried by the moving frame 45 and slidably engaged on and rotated by the shaft 24 through the agency of the groove 43 and a key. The cam 58 acts on the lever 56 through the agency of a roller 59 fitted to the lever, the sliding shaft 47 being acted upon through the agency of a rod 60 (FIG. 6) articulated to the member 53. The member 53 abuts two pins 61, 62 secured to the bifurcated member 52 and spaced apart at an appropriate distance to allow the member 53 to slide and when it abuts the pins 61, 62, to produce a two-and-fro motion of the member 52 to affect the opening and closure of the levers 48.

Figure 21:
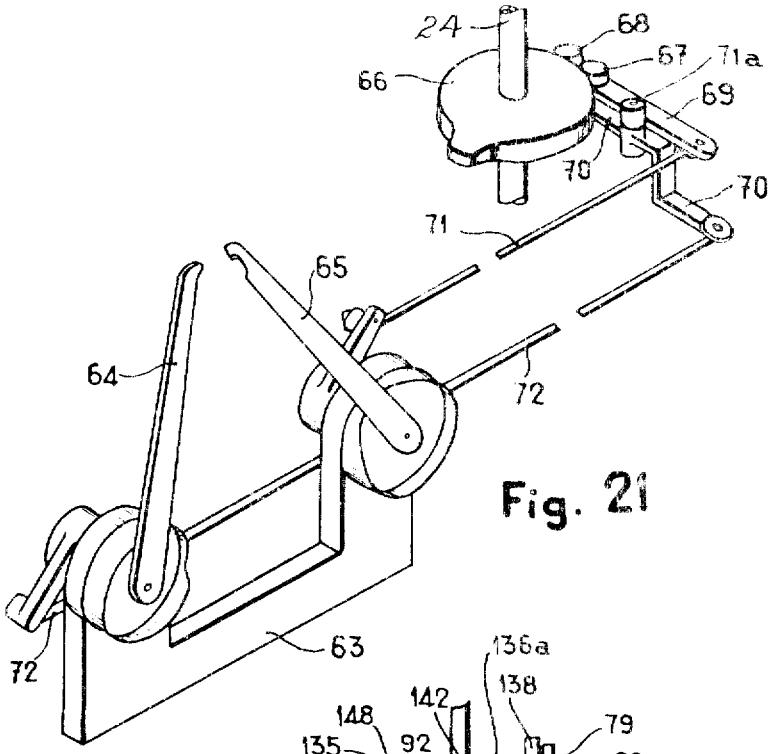
FIG. 21 illustrates the device for threading the thread through the traveller.

The moving frame 45 carries a U-shaped bracket 63 to facilitate the movement of the sliding shaft 47. Artculated to the ends of the bracket 63 are levers 64, 65 for threading the thread (FIGS. 1, 7 to 10 and 21) inside the traveleler 55 which, during the previous step, has been placed in the appropriate position. The levers 64, 65 are operated by a cam 66 (FIG. 1) which, like the cam 58, is disposed on the moving frame 45. The cam 66 is slidably mounted on the shaft 24, for rotation thereby, through the agency of the groove 43 and a matching key. The cam 66 operates rollers 67, 68 (FIG. 21) associated with levers 69, 70 which transmit a rocking motion to the arms 64, 65 through links 71, 72 pivotally connected to the levers 64, 65 through the agency of ball joints or the like so that the levers 64, 65 can pivot in the member 63 at an inclination to the horizontal and vertical planes, the better to perform their task of passing the tensioned thread through the traveller. The member 63 is rigidly secured to the moving frame 45 and, as can be seen in the drawings, is U-shaped to allow the passage of the traveller hunter and the suction tube.

Referring to FIGS. 7 to 9, the lever 64 places the thread 109 near the ring 50 below the bottom left-hand part and edge thereof, whereafter the arm 65 catches the thread and keeps it near the right-hand part and next to the edge of the ring 50, so that the tensioned thread is disposed below the ring 50 and describes an arc and is almost stuck to the edge of the ring 50. Consequently, when the arms 64 and 65 move apart from one another, the thread passes automatically through the inside of the traveller 55, for the thread, having been forced into the position shown, must be inside the traveller 55 as can be seen in FIG. 10. It is inadvisable for very fine and delicate threads to have to describe the arc just specified. All that is done with such threads is to engage the thread with only one part of the lower part of the edge of the ring 50, whereafter the traveller is moved from one side to the other by a lever like the lever 65 so that the thread is passed through the traveller.

The moving frame 45 is always in the working plane of the elements which it supports, that is, in the plane of the ring 50, since the search for the traveller and the passage of the thread are performed on such plane by means of a lever 73 (FIGS. 2 and 13) which carries the frame 45 and which places the same in an appropriate position because it is secured to a shaft 74 carried by a bracket 75 secured to the framework of the apparatus. Rigidly secured to the shaft 74 is a lever 76 having at its end a wheel 77 borne by the ring rail 78 of the continuous spinning machine.

It will be readily apparent that, whatever the position of the ring rail 78 and therefore of the ring 50, the moveing frame 45 and the elements borne thereby are always in a ready-to-operate position, so that a system of this kind can also be used in different machines consecutively because, owing to the presence of an appropriate inclination at the entrance of the ring rail, the moving frame 45 always takes up the correct position automatically, the wheel 77 rolling above the ring rail as the apparatus moves along the spinning machine. To obviate the need for the ring rail not to constantly have to provide all the force required to raise the moving frame 45 with all the mechanisms thereon, the lever device described can be appropriately counter-weighted to reduce the pressure of the wheel 77 on the rail very considerably.

In machines with very rapid winding, and to prevent excessive movement of the moving frame 45 therein in accordance with the reciprocating movement of the ring rail, the lever 73 has a pawl 79 engaging in a stationary quadrant rack 80 (FIG. 13) to prevent any downward movement. When the apparatus is to be operated for a joining operation, the pawl 79 is disengaged from the rack 80 automatically by any device operated by the thread position detector element, the moving frame 45 being positioned in the plane of operation by the roller 77 bearing against the ring rail 78. A further moving frame 81 (FIGS. 1, 2 and 14) is provided above the moving frame 45 and, like the latter can slide on the vertical guides 29. The moving frame 81 has vertical bearings 82 (FIG. 1) which, like the bearings 44, are adapted to slide along the guides 29. The frame 81 also carries bearings 83 (FIGS. 1 and 14) which are horizontally aligned and which are disposed transversely of the spinning machine and which guide a suction tube 84 (FIGS. 1, 2, 11 and 12). The suction tube 84 comprises a tube having at one end a bevelled aperture 85 of an inclination adapted to the conicity of the top layers of the thread bobbin 37. The angularly downward directed mouth-piece 85 can have a special shape or can be prolonged downwards with intention to be utilized with ring-rails having horizontally arranged anti-balloon rings. At its other end the suction tube curves downwards and is connected to an extensible rubber or plastic tube 86 connected to the inlet of the fan 9. To move the suction tube 84 from its inoperative position, disposed in the outside plane of the machine base-plates to the operative position, in which the suction tube 84 engages with the top layers of thread on the bobbin, the tube 84 must first be moved horizontally until the bobbin is found. To this end, the tube 84 is slid in the horizontal bearings 83 through the agency of a lever 87 which is pivoted at 88 (FIG. 1) and which is moved by the action of a cam 89 acting on a roller 90 carried by the lever 87. The cam 89 is guided by the moving frame 81 and is operated by the vertical shaft 24 on which the cam 89 is mounted, the motion being transmitted through the agency of the groove 43 in the shaft 29 and a key engaged therein. To ensure that the roller 90, and therefore the lever 87 bearing the same, are always in engagement with the cam 89, the suction tube 84 is urged towards its inoperative position by a spring 91. Since the plane of operation of the suction tube is always the plane of the top layers of thread on the bobbin, and the top layers always correspond to the maximum position of the ring rail 78, the sliding frame 81 is also borne through the agency of a lever 92 rockably mounted on the shaft 74. The lever 92 (FIG. 14) is associated with a pawl 93 mounted on the lever 73 and engaging a stationary ratchet wheel 94. Rising movements of the ring rail 78 are imparted to the lever 92 by the member 73, which is disposed adjacent the lever 92 on the same shaft 74, through the agency of a pin 95 disposed below the lever 92, the pawl 93 being disengaged from the ratchet wheel 94 by means of a top pin when the descent of the ring rail 78 is greater than normal, such as occurs when it descends for changing or when the apparatus passes from one continuous spinning machine to another in which the ring rail is at a lower level so that the moving frame 81 descends simultaneously with the moving frame 45.

The moving frame 81 must be able to move in two further ways; a rapid descent, when the suction tube 84 has reached the thread bobbin, in order that the suction tube 84, may descend inside the ring 50 and engage with the conical layer of thread on the bobbin; and a rising movement after the tube 84 has sucked the thread off the bobbin, to take the thread to the joining mechanism. To perform the rapid descent, the suction tube 84 has, at a distance from its lower part equal to the required vertical motion, a guide 96 which bears against the end of the lever 92 until, towards the end of its travel, it disengages and descends the required distance, the suction tube 84 then being opposite the cone of thread on the bobbin and being ready to search by suction for the end of the thread. To perform the rising movement, the moving frame 81 has a vertical toothed rack 97 (FIGS. 1 and 15) engaged by a pinion 98 disposed on the top bracket 30. Rigidly secured to the pinion 98 is a bevel pinion 99 which meshes with another bevel pinion 100 having a vertical axis and being secured to a small cylindrical wheel 101 meshing with a quadrant rack 102 carrying a roller 103 adapted to bear against a cam 104 rigidly secured to the end of the shaft 24. Connected to the cam 104 is a quadrant rack 105 which, at a desired fraction of a revolution of the shaft 24, engages with the wheel 101 through the agency of intermediate wheels 106, 107. During the rising movement of the ring rail 78, the lever 73 imparts to the lever 92 a rising movement corresponding to the increment of ascent undergone by the ring rail 78 during each oscillation, and the lever 92 transmits the motion to the frame 81, so that the toothed rack 97 moves upwards and therefore moves the gears 98 to 101, forcing the quadrant rack 102 to disengage its roller 103 from the cam 104, so that the rising action thereof which corresponds to the total movement is reduced in the high proportion corresponding to the separation between the roller 103 and the cam 104. When the same lifts the moving frame 81, it can do so up to the highest point of travel required, with appropriate intermediate stops as arranged by the system of operation of the cam 104. The moving frame 81 descends by its own weight and with the help of its toothed rack 97, and the transmission just described compels the roller 103 to be in engagement with the descending surface of the cam 104 until the frame 81 engages with the bearing lever 92, that is, when it reaches the level of its plane of operation, whereafter the cam 104 disengages from the roller 103.

The quadrant rack 105 and the intermediate wheels 106, 107 serve to raise the suction tube 84 to its initial position after its descent to engage it with the conical surface of the thread on the bobbin. To this end, after the suction tube 84 has sucked the end of the thread on the bobbin and the same has performed a sufficient number of backward turns to locate and unwind the thread, the quadrant rack 105 engages with the gear 106 and the same transmits the movement to the gear train 98–101, the gear 98 transmitting the movement to the toothed rack 97 which moves upwards, raising the frame 81 and the suction tube 84, the same disengaging from the cone of thread on the bobbin. Also, through the agency of the lever 87 and cam 89, the suction tube 84 is moved horizontally and far enough for the horizontal guide 96 to bear against the lever 92, so that the rising movement can stop and the quadrant rack 105 therefore passes beyond the gear 106 and ceases to actuate the same. It is now clear that the continuous suction of the thread into the suction tube and the braking of the spindle after a sufficient number of backward turns, as mentioned above, can produce a tensioned or stressed length of the thread. Meanwhile the very end of the broken thread is not free but is situated in the interior of the suction tube. The threading of the broken thread does not consist in introducing the thread end into the traveller or into the thread guide, but the introduction or threading is laterally.

This is one of the most important features of the present invention.

The moving frame 81 comprises an arm 108 adapted to pass thread 109 (FIGS. 1, 16 and 17) through a thread guide 110. To this end, the suction tube 84 trains the thread over an arm 111 of the thread guide 110, the suction tube 84 pausing in its rising movement in the corresponding plane to perform such operation, whereafter the lever or arm 108, which is pivoted at 112, descends rapidly, with the result that since the lever or arm 108 almost rubs against the thread guide 110, the thread 109 is introduced thereinto. The lever 108 is moved through the agency of a set of levers and cams similar to the elements 87 and 89 hereinbefore described and disposed in the lower part of the moving frame 81 and driven by the same vertical shaft 24.

Figure 1:
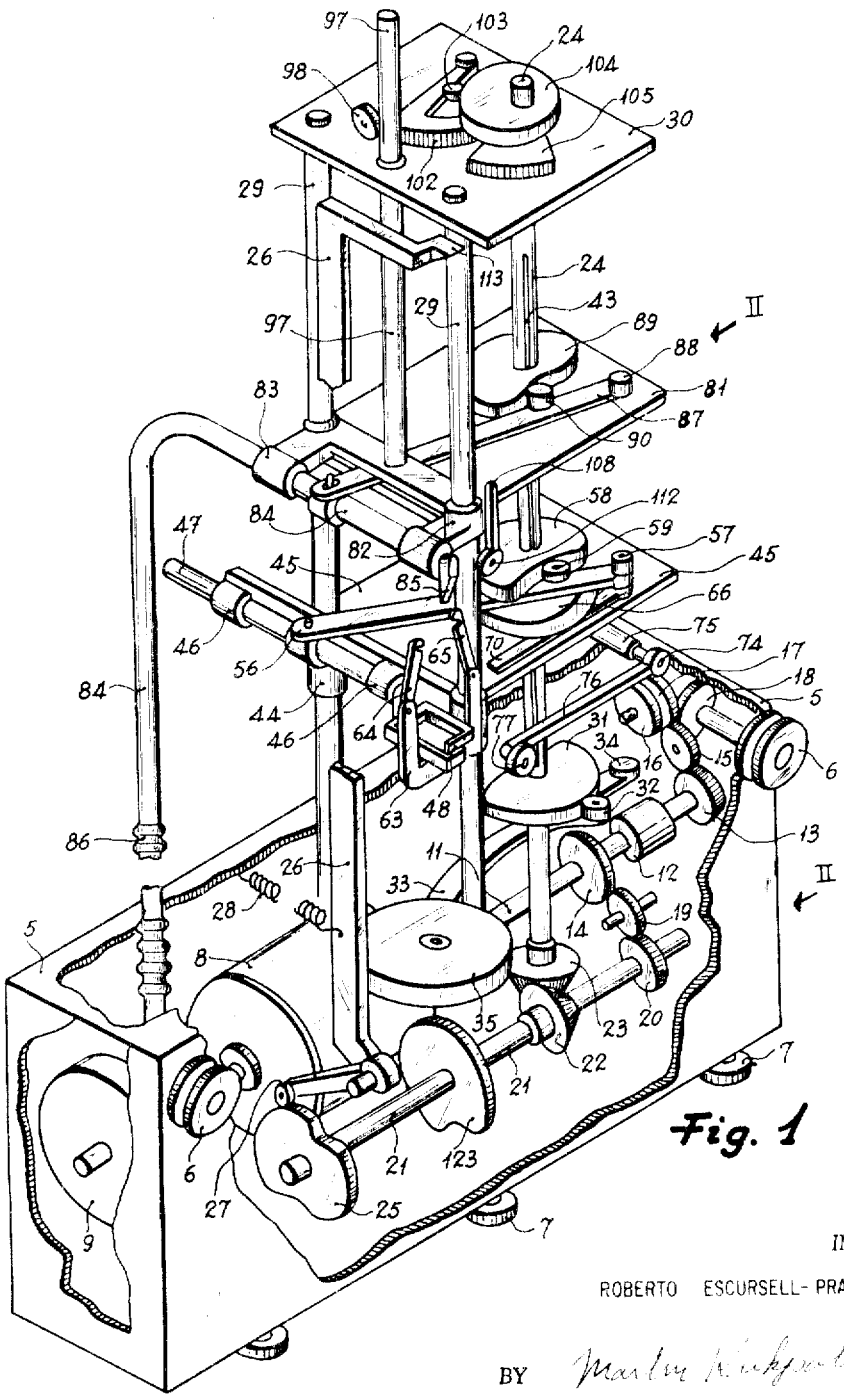
FIG. 1 is a perspective view of the apparatus, some parts being broken away in order that other elements may be seen.

The thread-joining lever 26, which can be seen in FIGS. 1, 18 and 19, has at its top end 113 a nosepiece or extension which is a close fit in the nip of the drafting rollers 114 and 115. The lever end 113 has an inclined rearward edge 116 so that the thread in such part can pass readily to the front part where it must be placed for joining. The lever end 113 has in its upper surface a groove 117 into which the thread penetrates, the thread being clamped, simultaneously as it is severed, by a member 118 when the lever 26 moves rearwardly and abuts an element 119. The severed piece of thread which extends from the gripper 118 to the suction tube 84 is withdrawn thereby, passing into a waste collector. When the joiner 113 approaches the rollers to perform the thread-joining step, a member 120 on the joiner 113 abuts the roller 115 to open the gripper 118. The released thread is engaged and joined with the loose fibre or roving issuing from the producing rollers so that there is no interruption in the production of thread on this bobbin. Just before joining the end of the broken thread with the parallelized fibres of the roving, the braking of the spindle has finished and the thread end is newly rotating at high speed and engaging with the loose fibres of the roving forming immediately a sufficient strong union, performing the desired joining without any additional adhesives or the like. If required, this joining device can comprise an auxiliary suction tube to facilitate removal of the roving from the drafting roller.

By way of example, one sole detecting device can take the form of a lever entering in sliding contact with the threads one after the other during the advancing movement of the carriage or, in the case of delicate threads likely to be damaged by the pressure of the lever, of a photoelectric cell system or some similar electronic system. In the textile industry there are well known detecting devices of broken threads, one device for each tensioned thread, having the form of a lever permanently in rolling or sliding contact with one individual thread. In accordance with the present invention there is only one single device mounted on the moving carriage, but it must have a greater or longer shoe, so that during the advance of the carriage the device can be always in a horizontally sliding contact with at least one thread and as a maximum with two threads simultaneously, but never with three threads because in this case the middle thread could be broken but not detected.

Figure 4:
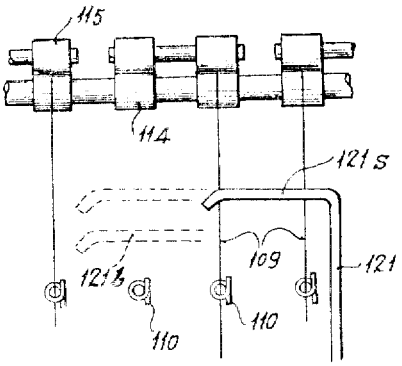
FIG. 4 shows how the detector co-operates with the threads of the spinning machine.

Observing FIGURE 4, the lever 121 has one sliding shoe 121s covering a litlte more than the distance between two threads 109, but less than the distance between three threads. When the lever 121 reaches a drawing station where the thread has broken, it ceases to have the broken thread bearing upon it and drops forwards slightly to a position 121b, this movement being converted into the emergence of an electrical contact member 122 (FIG. 3) which bears against the bottom part of the spindle, the apparatus being placed exactly in the position necessary for joining the thread. The member 122 also simultaneously operates an electric brake (not shown) and the clutch 12 to disconnect the drive to the wheels 6 and connect the drive to the thread joining system of the carriage.

The shaft 21 of the joining device comprises a cam 123 which, when it is moved, moves the lever 121 backwards into the position 121a shown in FIG. 3, to ensure that the lever 121 does not cause any disturbance while joining is being performed. Upon the completion of joining the cam 123 allows the lever 121 to return to its initial position, whereafter, if the lever 121 engages with the thread but does not pass to the position 121b, the clutch 12 is changed over and the ordinary mechanism started and the electric brake is released. If because of the absence of thread the lever 121 can move to position 121b, however, the clutch 12 remains in the same position and the joining cycle just outlined is repeated.

When the absence of thread in the zone extending from the drafting rollers to the thread guide is due to outside causes, such as a breakage of the driving belt, breakage of the traveller, lack or breakage of roving or the like, the cycle just described is repeated indefinitely and so the device does not work at all, with corresponding consequences in the machines to which it is fitted. To prevent this state of affairs from occurring, the machine starts to operate and leaves the thread to be joined if it has not been joined in the first, second, third, and so on, attempt, the number of attempts being optional or being selectable by the user by means of a ratchet wheel 124 adapted to be operated by a pawl 125 secured to the cam 123 and which at each revolution causes a tooth of the wheel 124 retained by the counterpawl 126 to jump, the counterpawl 126 preventing the ratchet wheel from rotating in the opposite direction to that in which it is driven by a spring 127. A member 128 can be placed on the ratchet wheel 124, in accordance with the number of repetitions required, and operates at the required moment to prevent the lever 121 dropping to restart the joining cycle, the lever 121 staying at the same height as if thread were present until the apparatus starts and the lever 121 can be borne by the nearest thread. The counterpawl 126 is then released for an instant, the ratchet wheel being returned to its initial position by the spring 127. This instantaneous release of the ratchet wheel occurs whenever the apparatus has been stopped to perform a joining operation.

Figure 28:
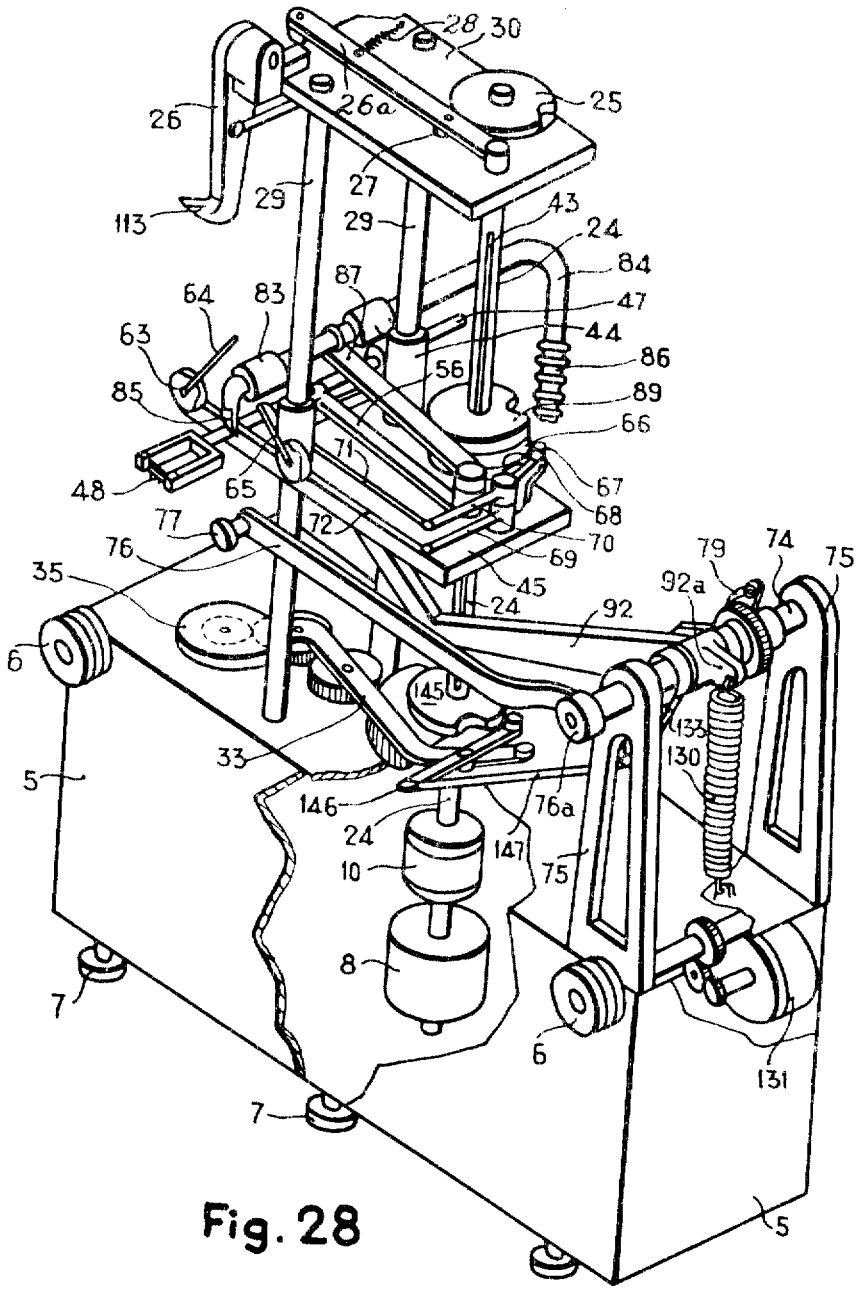
FIG. 28 is a perspective view of a modified apparatus.

A modified embodiment of the apparatus described with reference to FIG. 1 is shown in FIG. 28, which discloses only one moving frame or platform 45. This system is an improvement because the whole apparatus is less complicated owing to the suppression of the second higher frame, and because the raising means are simplified, but the system is less versatile than the system with two or more platforms as described before, owing to the fact that if the system is operating with two vertically moving platforms there is the possibility of simultaneous movements, resulting in a greater working speed.

The apparatus shown in FIG. 28 differs from that shown in FIG. 1 in that the suction tube 84 with its mouthpiece 85 together with its moving means, lever 87, cam 89 etc., are mounted on the platform 45, together with the cams 58 and 66 and its rolls and levers for the traveller hunting means, and thereby form a much more simplified structure where the same levers are arms 64 and 65 can be utilized for threading the thread into the thread guide (FIGS. 16, 17) instead of the lever 108 mounted on the platform 81.

Figure 29:
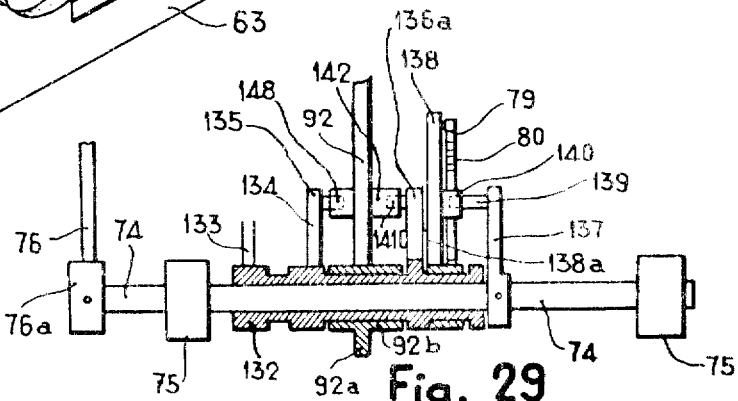
FIGS. 29 and 30 are details of FIG. 28.
Figure 30:
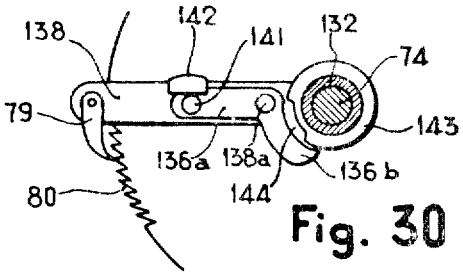

All the movements of the platform 45, where now are mounted all the different means of the previous two platforms, are produced by the lever 92 (FIGS. 28 and 29) pivotable on the shaft 74 on bearing 75. This shaft 74 receives its rotating movement as described before from the ring rail by means of the lever 76 and its roller 77 bearing against the ring rail. As the weight of the platform 45, with all its different means together mounted on it, is too heavy to be raised by the oscillating ring rail and by the cam 145 which effects its elevation to the level of the drafting cylinders, there is provided the lever 92 acting under the platform 45 and rotating about the shaft 74, the long arm of the lever 92 being counterbalanced by a strong spring 130 acting on the short opposite arm 92a.

The exact position of the platform 45 is always obtained by means of the lever 76 fixed on one end of the shaft 74 and bearing against the upper surface of the ring rail (FIG. 28). A lever 137 (FIG. 29) is fixed on the shaft 74 and carries a lateral rod 139 which, during the oscillating movement of the ring rail, is urged against a piece 140 on the lever 138 and urging the same to follow the ascending movement of the ring rail. However, said lever 138 cannot turn downwards to the initial position of the ring rail if the lever 137 is moving downwards, owing to the pawl 79 co-operating with the ratchet wheel 80.

The lever 138 rotating freely about the shaft 74, is connected pivotally through the pivot 138a to an angular lever 136a, b which lever has on its part 136a laterally fixed thereto a rod 141 urging against a piece 142 mounted on the lever 92 which, as mentioned before, is acting under the platform 45 which is receiving by such means the incerased ascending movements of the ring rail.

The part 136b of the angular lever is urged against the ring 143 which has a recess 144 in its periphery, this ring being fixed on the bushing 132, and means while the levers 92 and 138 can rotate about said bushing 132. On this bushing 132 is fixed another lever 133 which is actuated by the cam 145 (FIG. 28) mounted on the lower end of the vertical shaft 24, and the lever 133 receives its movement by means of the levers 146, 147 through universal ball joints.

The cam 145, rotated by the shaft 24, is then really giving the ascending and descending movements to the platform 45 co-operating with the lever 76 moved by the ring rail.

For example, if the suction mouthpiece has been horizontally moved to the bobbin and then must descend for entering into contact with the cone of the bobbin, the cam 145 acts upon the lever 133 which rotates slightly the bushing 132 in such a manner that the fixed ring 143 makes a rotating movement to oppose its recess 144 to the lever end 136b, and then the rod 141 on the lever end 136a moves downwards together with the piece 142 and the lever 92, which movements determine the descending movement of the mouthpiece of the suction tube into the inner part of the ring 50 (FIG. 10). If the mouthpiece has been in contact with the cone of the bobbin during a pre-calculated period of time, it is necessary to perform a raising movement in order to withdraw the mouthpiece from the bobbin. In this event, the cam 145 in its further rotating movement causes an inverted movement of the lever 133 so that the ring 143 turns to its initial position and the lever 136a, b turns to its first position rotating about its pivot 138a, thereby raising the rod 141 which lifts the piece 142 and its lever 92 to its initial position, increased eventually by a small distance corresponding to the increased height of the ring rail by means of the pawl 79 and the ratchet wheel 80.

If the platform 45 then is to be raised further, the cam 145 moves the lever 133 together with the bushing 132 on which is fixed the arm 135, with another rod 148 urging against the other end of the piece 142 of the same lever 92. By this means the different heights of the platform 45 can be obtained for fulfilling its functions, for example, the threading of the thread in the gripper, or for threading the thread in the thread guiding device.

But the traveller hunting device and the traveller threading device must follow exactly the oscillating movements of the ring rail and therefore the platform 45 must follow the oscillation of the ring rail. This is performed by another lever analogous to the lever 13a, b (not shown) but fixed pivotally to the lever 137 and co-operating with a ring similar to the ring 143 with its recess 144. A rod similar to the rod 141 acts in a similar manner on the lever 92 allowing it to follow the oscillating movement of the lever 76 and the ring rail.

All the necessary movements of the apparatus can be simplified.

In FIG. 28 the vertical shaft 24 is actuated directly by the motor 8 and the reduction gear 10, and the horizontal movement of the carriage on the rails 3 and 4 is effected by a second motor 131. Utilizing this system the clutch device 12 can be suppressed.

In FIG. 28 it can be observed that the lever 26 for joining the thread end with the roving on the drafting rollers can work in the inverted position shown in dotted lines in FIGURE 18.

Figure 22:
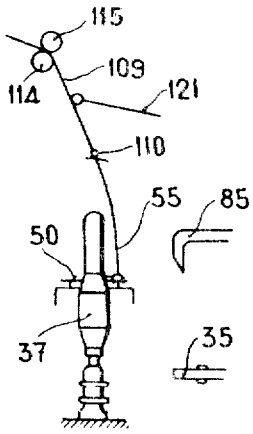
FIGS. 22 to 27 illustrate various phases in the general operation of the apparatus.

The apparatus described operates as follows:

Where the apparatus is to operate only on a single machine, the guides 3 and 4 are connected to the machine ends through the agency of curved guides which complete the closed movement circuit. If the apparatus is to join broken threads on a number of machines, it can be suspended from equivalent guides placed at a suitable height to allow staff to move around freely between machines. In any case the apparatus can move either in a closed circuit or in both directions, to deal with one or two or more machines. The drive of the electric motor 8, which is supplied through appropriate sliding contacts, is transmitted to the groove wheel 6 which bears against the guide 3 determining the movement of the apparatus in front of the machine bobbins, the lever 121 bearing permanently against that part of the threads 109 which extend from the front rollers as far as the thread guide 110. During the displacement, the wheel 77 at the end of the lever 76 moves above the ring rail 78 while transmitting the vertical reciprocations thereof to the moving frames 45, 81 by way of the lever 73, so that the other elements hereinbefore described are always in the required plane of operation for performing joining operations. As can be seen in FIGS. 3, 4 and 22, that end of the lever or detector 121 which rests on the threads 109 has a width slightly greater than the distance between two consecutive spindles and less than the distance between two alternate spindles, so that when the member 121 reaches a spindle, the associated bobbin of which has the thread broken, it ceases to be borne by the thread and moves into the position 121b whereupon the electric brake and clutch 12 are operated, whereby the apparatus is stopped and the drive engaged with the joining mechanism. When the shaft 21 moves, the cam 123 first returns the lever 121 from its position 121b to position 121a to prevent it from being an obstacle during the following operations. As the lever 121 moves back, the member 122 returns to the position in which it was before the machine was stopped. The shaft 21 transmits its movement to the shaft 24 through the agency of the bevel gears 22, 23, and the time for joining a thread is one revolution of the shaft 24.

Figure 23:
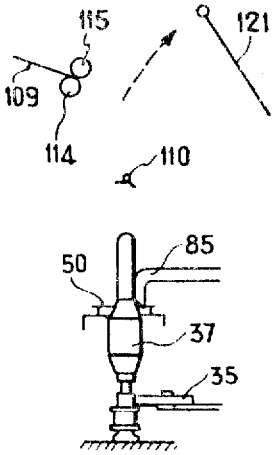

As the members 121, 122 return to the position shown, the wheel 35 having the rubber rim 36 moves towards the spindle, the rim 36 engaging therewith and stopping the same, as can be seen in FIG. 23. The member 53 of the traveller placing mechanism then advances, opens the levers 48 by way of its extensions 54 and, upon engaging with the pins 61, moves the members 52 and 47 forward until the pins 49 pass beyond the traveller guide ring 50. Also, the suction tube 84 is moved by the action of the associated levers and cams 89, 87 and when it reaches the end of its travel, descends, because of the absence of bearing support by the lever 92, on to its bottom guide 96 until the lever 92 engages with or abuts the corresponding part of the suction tube 84. The purpose of this descent is for the member 85 on the end of the suction tube 84 to pass through the traveller guide ring and for its end 85 to be placed near the conical surface of the final layers of thread on the bobbin (FIG. 23). When the suction tube 85 has reached this position, the wheel 35 is operated by the quadrant rack 40 so as to move the spindle 37 in the direction opposite to the direction of normal operation. This reverse movement of the bobbin, together with the suction produced by the fan 9, engages the loose end of the bobbin in the tube 84, a sufficient length of thread end being thus engaged to make a joining at the drafting rollers. For working with fine threads the edge of the tube end 85 can have bristles or the like which rub on the bobbin surface to facilitate disengagement of the broken end.

Once the bobbin has started to rotate backwards, the member 53 returns so that first the small levers 48 close, then, as the return movement of the member 53 continues, the same abuts the pins 62 in the member 52 and causes the member 48 to return with the member 53. The pins 49 at the end of the levers 48 therefore bear against the ring 50, travelling over the entire edge thereof and taking with them the traveller 55, wherever it may be, towards the front part of the ring 50. Once the traveller has been placed in the front part of the ring 50, the suction tube together with the associated moving frame 81 is raised rapidly by the quadrant rack 105. The suction tube then performs a rapid return movement to its original position (lever 87, cam 89), so that when the quadrant rack 105 ceases to operate, that is, the toothed rack and the moving frame 81 tend to descend, the guide 96 abuts the lever 92 and remains in the initial position.

Figure 24:
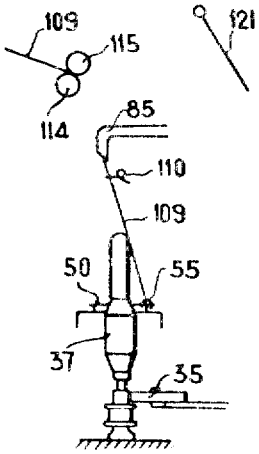

The thread, which now extends from the bobbin to the suction tube 84, is caught by the lever 65 on the moving frame 45 and operated by the cam 66, and the thread is moved (FIGS. 7 to 10, 19 and 20) as far as the edge of the ring 50, whereafter the other lever 64, which is also moved by the cam 66, immediately catches the thread and carries the same to the top left-hand part of the ring 50, the thread thus describing an arc having as its basis and limit the bottom part of the edge of the ring 50 and passing inside the traveller below the outside part thereof. When the two levers immediately return thereafter to their initial position, the thread has been passed through the traveller which is within the zone in which the thread described a semicircle, as can be seen in FIG. 24.

After these operations the moving frame 81, together with all the parts included therewith, is raised, this time by the cam 104 which acts upon the roller 103 secured to the quadrant rack 102 to raise the toothed rack rigidly secured thereto.

Since the height of the moving frame 81 on the vertical guides 29 varies with the position of the ring rail 78, and since the travel of the cam 104 must be such as to cover all cases, the same is arranged to have sufficient travel to raise the toothed rack from the lowest to the highest positions of its travel. If, for instance, the ring rail 78 is in its central position, the moving frame 81 and the toothed rack 97 are maintained at this level by the lever 92. The toothed rack 102 therefore has its rollers 103 at a distance from the cam 104 and is not operated thereby until in its travel it reaches the position corresponding to such height, thereafter continuing its ordinary movement. The same events occur during the descent but in the reverse order.

Figure 25:
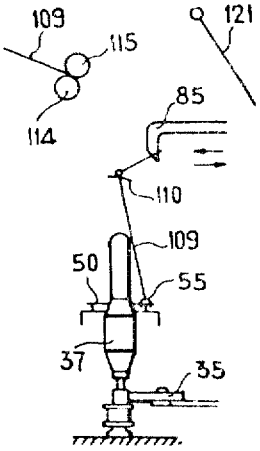
Figure 26:
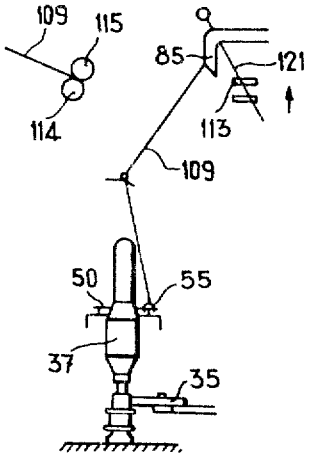
Figure 27:
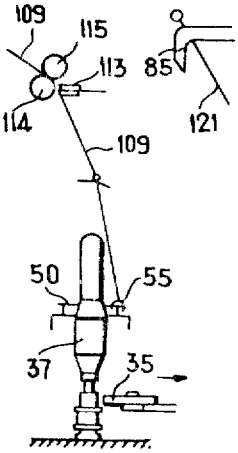

This rising movement of the moving frame 81 continues until the end 85 of the suction tube 84 is a little higher than the thread guide 110 (FIG. 24), whereafter the tube 84 is again moved horizontally towards the machine by the means hereinbefore described, so that the thread 109 (FIGS. 16 and 24) is placed behind the thread guide 110 and, upon its return movement, the arm 108 operates and, in a rapid descending movement, forces the thread completely into the thread guide (FIGS. 17 and 25). The suction tube 84 returns to its original internal position and rises (FIG. 26), while the joining lever 26 with its gripper 113, 118 inclines forward to allow the tube end 85 to pass. When the moving frame has reached its highest position, that is, when the suction tube is above the joining gripper, it shifts towards the machine again while the gripper moves in the opposite direction, so that the thread, as it moves above the inclined part 116, is placed on the front part of the joiner. The same immediately performs a forward movement and the suction tube moves back, the thread passing through the groove 117 and being caught therein, whereafter the joining lever immediately moves back until the member 118 abuts the member 119 rigidly secured to the framework of the apparatus, the gripper thus being closed and the excess thread being severed and withdrawn into the suction tube. The joining lever 26 then makes a rapid movement towards the drafting rollers, while the rubber covered roller 35 disengages from the base of the bobbin and the same starts to rotate, so that when the joiner comes near the drafting rollers (FIG. 27) the same are rotating at full speed. The thread then engages with the roving which issues therefrom, and almost immediately thereafter the lever 120 touches the bottom producing roller, the impact causing the gripper 118 to open and therefore the gripped thread to be released, so that the thread is joined and normal thread production restarts.

All the devices described return to their inoperative position and the detector lever rests on the joined thread, stays in the normal position and stops the operation of the joining devices and restarts the apparatus for shifting the thread joiner. If, however, the thread has not been joined for some reason, the detector lever moves into position 121b and the action of the electric brake does not cease, nor does the action of the clutch 12 change, and so the cycle described is repeated for a desired number of times depending on the position of the repetition lever 128.

What I claim and desire to secure by Letters Patent is:

1. An automatic thread joiner for use with continuous spinning machines of the type including a spindle rail supporting a plurality of aligned bobbin supporting driven spindles for each of which a thread is formed of roving issuing from drafting rollers and fed through a fixed guide and a traveller on a ring surrounding the respective spindle, the rings for all of the spindles being carried by a ring rail reciprocable axially of the spindles so that the travellers will guide the thread along the bobbins as it is wound thereon by rotation of the spindles; said thread joiner comprising a carriage movable along the spindle rail of a spinning machine; a detector device movably mounted on said carriage and including a shoe for slidably engaging the threads between the drafting rollers and fixed guides of the spinning machine; thread joining mechanism including means on said carriage for braking and stopping the spindle corresponding to a broken thread, support means vertically movable on said carriage, an extractor on said support means and having a mouthpiece for extracting the end of the broken thread from the bobbin on such spindle and establishing a stressed length of thread between the mouthpiece and the bobbin, means for moving the extractor mouthpiece together with said stressed thread into the appropriate position for being threaded, means on said support means for threading the stressed thread into the respective fixed thread guide on the spinning machine, means on said support means for hunting and moving the respective traveller to a predetermined position on its ring, means on said support means for threading the stressed thread laterally through thetraveller, a device for gripping the thread raised by the extractor mouthpiece and having means for cutting off excess thread, said gripping device being operative to place the cut thread end in engagement with the roving issuing from the respective drafting rollers and releasing the cut thread end to be joined with the roving, and means on said carriage responsive to the height of the ring rail for moving said support means to the proper level; and drive means on said carriage for driving said carriage and operating said thread joining mechanism and including clutch means actuated by said detector device to drive said carriage until a broken thread is detected and thereupon stop said carriage and drive said thread joining mechanism.

2. An automatic thread joiner according to claim 1, wherein said detector device comprises a lever terminating in a shoe of a length greater than the distance between two threads and less than the distance between three threads, said lever being pivotally mounted so that the shoe normally rests on the threads and retains the clutch means connected to the carriage but upon dropping due to a broken thread, connects said clutch means with said thread joining mechanism.

3. An automatic thread joiner according to claim 2, comprising an abutment engageable by said detector lever and terminating in an electrical contact member adapted to be connected to the bottom part of the spindles and transversely movable relatively to the spinning machine between a withdrawn position, which it takes up during movement of the carriage, and a position for coupling with the spindle on which the thread has broken, in order that the thread joining mechanism may be correctly placed before joining starts.

4. An automatic thread joiner according to claim 2, comprising a raising device which raises said detector lever above the normal operative position to rest the lever again on top of the joined thread and to restart the movement of the carriage.

5. An automatic thread joiner according to claim 2, comprising a joining cycle counter which permits repetitions of the joining cycle in cases of failure to effect joints but connects the mechanism for shifting the thread joiner after a desired number of unsuccessful joining attempts have been made.

6. An automatic thread joiner according to claim 1, wherein said carriage comprises a casing enclosing said drive means, and an upper platform maintained at a fixed distance vertically above the casing by means of at least one column, and said support means comprises at least one intermediate platform between the casing and the upper fixed platform and being vertically movable and slidably guided along said column.

7. An automatic thread joiner according to claim 1, wherein said ring rail responsive means includes a raising mechanism which responds to the maximum height of the ring rail at the moment of thread breakage to place the thread joining mechanism at the height of the final layers of thread on the bobbin and of the traveller guide ring, and additional height increasing mechanism, which responds to the oscillating movement of the ring rail during the time of the threading process of the joining mechanism.

8. An automatic thread joiner according to claim 7, wherein said raising mechanism includes a releasable retaining device which normally maintains the joining mechanism in the highest position reached by the ring rail in each rising movement, and means for releasing said retaining device, such means being operated upon actuation of the joining mechanism to bring said mechanism to the instantaneous level of working when there is a breakage, or to return them to the lower starting position after a change over.

9. An automatic thread joiner according to claim 7, wherein the raising mechanism comprises a rocking lever which bears against the ring rail and is connected to the support means by a ratchet device which normally prevents lowering thereof.

10. An automatic, thread joiner according to claim 1, wherein said traveller hunting means comprises a bifurcated member adapted to be moved transversely of the machine between a withdrawn position and a position in which its arms straddle the traveller guide ring of the station where the breakage has occurred, the arms having two articulate search arms resiliently urged so that their ends bear in overlapping relationship against the periphery of said ring and pass thereover when the bifurcated member returns and moving the traveller to threading position.

11. An automatic thread joiner according to claim 10, comprising a second bifurcated member movable relative to said first mentioned bifurcated member and having front extensions which open the traveller search arms as it moves forward.

12. An automatic thread joiner according to claim 1, wherein said extractor comprises a suction tube connected to the entry of air impeller and adapted to be moved transversely of the machine for engagement of the mouthpiece with the last turns of thread on the bobbin, and brushing bristles on the mouthpiece for engaging the end of the broken thread.

13. An automatic thread joiner according to claim 12, wherein said spindle braking means comprises a drivable element which is displaceable to be engaged with the lower part of the spindle when a thread breakage has occurred to stop such spindle, and means for rotating said element backwards overcoming the rotating force of the spindle to facilitate unwinding of a predetermined length of thread sucked in by the suction tube.

14. An automatic thread joiner according to claim 10, wherein said traveller threading means comprises two threading arms articulated to a bracket disposed one on each side of the traveller-hunting bifurcated member and rocking in two planes which are inclined relatively to the ring rail, and operating mechanism for moving said threading arms successively, first the one arm, which moves the thread stretched between the bobbin and said extractor towards one side of the traveller, and then the other arm, which moves the thread stretched between the first arm and the extractor towards the opposite side of the traveller, the thread engaging with part of the periphery of the traveller guide ring below the flange edge of the ring so as to be introduced into the traveller.

15. An automatic thread joiner according to claim 12, wherein said support means comprises a vertically movable bracket which supports said suction tube to be moved transversely, whereby the moving means for said support means disposes said suction tube at the approximate height of the drafting rollers of the machine.

16. An automatic thread joiner according to claim 12, wherein said fixed guide threading means comprises an articulated arm having a trajectory which intersects the thread stretched between the suction tube and the traveller and resting upon the thread guide opposite the aperture thereof, and means for imparting to said arm a descending movement between a position above the thread and a lower position in which it forces the thread to describe a convolution around the end of the thread guide.

17. An automatic thread joiner according to claim 12, wherein said gripper device comprises a gripper having a nosepiece movable transversely of the machine between a withdrawn position, disposed below the highest position of the suction tube, and a position in which its nosepiece is introduced between the drafting rollers, carrying the thread with it and placing the same in engagement with the roving issuing from the drafting rollers to join the thread to the roving, such gripper having opening means which are operated when it engages with the rollers, and means for cutting the excess length of thread which is drawn into the suction tube.

*18. An automatic thread joiner for a textile machine of the ring-traveller type including*

*a plurality of aligned thread package supporting driven spindles for each of which a thread is issued from thread delivery means and fed through a traveller on a ring surrounding the respective spindle to wind it on the thread package by rotation of the spindle*

*said thread joiner comprising*

*detector means for sensing the absence of a thread extending between a thread delivery means and its package*

*spindle brake means responsive to said detector means*

*a carriage movable along said aligned spindles*

*thread joining mechanism on said carriage including*

*extractor means for extracting the end of the broken thread from the thread package on such spindle and establishing a stressed length of thread between said end and its package*

*aligning means for aligning the respective traveller to a threading position on its ring*

*threading means for threading the stressed thread laterally through the traveller*

*engaging means operative to place the thread end in engagement with the thread issuing from the respective thread delivery means and*

*drive means responsive to said detector means for driving said carriage and operating said thread joining mechanism to drive said carriage until a broken thread is detected at a spindle and thereupon stop said carriage at said spindle and drive said thread joining mechanism automatically to join said broken thread at said spindle to a thread at its respective thread delivery means.*

*19. An automatic thread joiner as claimed in claim 18 wherein said textile machine includes*

*a thread guide and*

*wherein said thread joining mechanism is operative to thread said thread guide.*

*20. An automatic thread joiner for a textile machine of the ring-traveller type including*

*a plurality of aligned thread package supporting driven spindles for each of which a thread is issued from thread delivery means and fed through a traveller on a ring surrounding the respective spindle to wind it on the thread package by rotation of the spindle*

*said thread joiner comprising*

*detector means for sensing the absence of a thread extending between a thread delivery means and its package*

*a carriage movable along said aligned spindles*

*thread joining mechanism on said carriage including*

*extractor means for extracting the end of the broken thread from the yarn package on such spindle*

*threading means for threading the extracted thread through the traveller*

*engaging means operative to place the thread end in engagement with the thread issuing from the respective thread delivery means, and*

*drive means responsive to said detector means for driving said carriage and operating said thread joining mechanism to drive said carriage until a broken thread is detected and thereupon stop said carriage and drive said thread joining mechanism automatically to join said broken thread.*

*21. An automatic thread joiner as claimed in claim 20 wherein said thread joining mechanism further includes*

*spindle braking means responsive to said detector means.*

*22. An automatic thread joiner for a textile machine of the ring-traveller type including*

*a plurality of aligned thread package supporting driven spindles for each of which a thread is issued from thread delivery means and fed through a traveller on a ring surrounding the respective spindle to wind it on the thread package by rotation of the spindle*

*said thread joiner comprising*

*a carriage movable along said aligned spindles*

*thread joining mechanism on said carriage including*

*threading means for threading a thread end on the package through the traveller*

*engaging means operative to place the thread end in engagement with the thread issuing from the respective thread delivery means and*

*drive means driving said carriage and operating said thread joining mechanism automatically to join said broken thread.*

*23. An automatic thread joiner as claimed in claim 22 wherein said thread joining mechanism further includes*

*aligning means for aligning the respective traveller to a threading position on its ring.*

*24. An automatic thread joiner as claimed in claim 23 further including extractor means for extracting an end of thread from a package for threading by said threading means through said traveller.*

*25. A thread joining mechanism for a textile machine of the ring-traveller type including,*

*a thread package supporting driven spindle for which a thread is issued from thread delivery means and fed through a traveller on a ring surrounding the spindle to wind it on the thread package by rotation of the spindle*

*said thread joining mechanism comprising*

*holding means for holding an end of said thread and establishing a stressed length of thread between said end and its yarn package*

*threading means for threading the stressed thread laterally through the traveller and*

*engaging means operative to place the thread end in engagement with thread issuing from said thread delivery means to join together said thread.*

*26. A thread joining mechanism as claimed in claim 25 wherein said holding means includes means for extracting the end of the broken thread from the yarn package on said spindle.*

*27. A thread joining mechanism as claimed in claim 26 wherein said mechanism further includes*

*aligning means for aligning the respective traveller to a threading position on its ring.*

*28. A thread joining mechanism for a textile machine of the ring-traveller type including,*

*a thread package supporting driven spindle for which a thread is issued from thread delivery means and fed through a traveller on a ring surrounding the spindle to wind it on the thread package by rotation of the spindle*

*said thread joining mechanism comprising*

*extractor means for extracting the end of the thread from the thread package and holding said end establishing a length of thread extending from said thread package*

*threading means for threading said held thread end through the traveller and*

*engaging means operative to place the thread end in engagement with the thread issuing from said thread delivery means to join together said threads.*

*29. A thread joining mechanism as claimed in claim 28 wherein said textile machine further includes*

*detector means for sensing the absence of a thread extending between a yarn delivery means and its yarn package, and wherein*

*said thread joining mechanism is responsive to said detector means.*

*30. A thread joining mechanism for a textile machine of the ring-traveller type including,*

*a thread package supporting driven spindle for which a thread is issued from thread delivery means and fed through a traveller on a ring surrounding the spindle to wind it on the thread package by rotation of the spindle*

*said thread joining mechanism comprising*

*threading means for threading a thread end on the package through the traveller and*

*engaging means operative to place the thread end in engagement with the thread issuing from said thread delivery means to join together said threads.*

*31. A thread joining mechanism as claimed in claim 30 wherein said mechanism further includes*

*aligning means for aligning said traveller in a threading position on said ring.*

*32. A thread joining mechanism as claimed in claim 28 wherein*

*said extractor means establishes a stressed length of thread and wherein*

*said threading means threads said stressed length laterally through the traveller in said threading position.*

References Cited

The following references, cited by the Examiner, are of record in the patented file of this patent or the original patent.

UNITED STATES PATENTS

| | | | |
|---|---|---|---|
| 2,449,742 | 9/1948 | Foster et al. | 57—57 |
| 2,786,324 | 3/1957 | Keith et al. | |

FOREIGN PATENTS

| | | |
|---|---|---|
| 553,305 | 12/1956 | Belguim. |
| 294,148 | 10/1929 | Great Britain. |

OTHER REFERENCES

German printed application 1,069,042, Rossi, November 1959.

German printed application 1,118,665, Zymanski, November 1961.

FRANK J. COHEN, *Primary Examiner.*

J. PETRAKES, *Assistant Examiner.*